No. 630,761. Patented Aug. 8, 1899.
J. A. WILMOT.
COFFEE POT.
(Application filed Oct. 29, 1898.)
(No Model.)
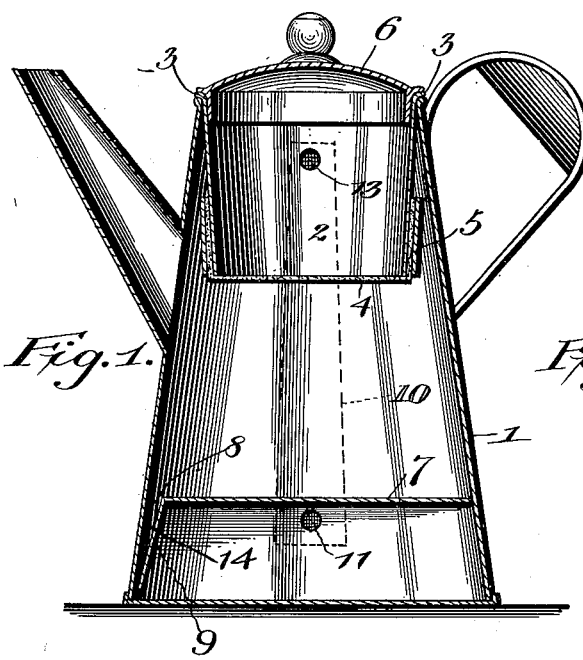
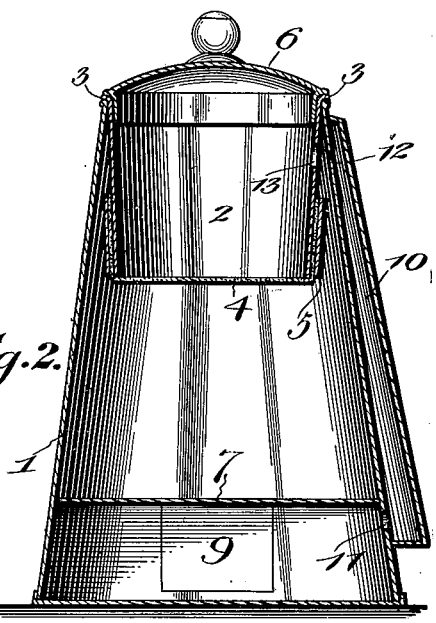
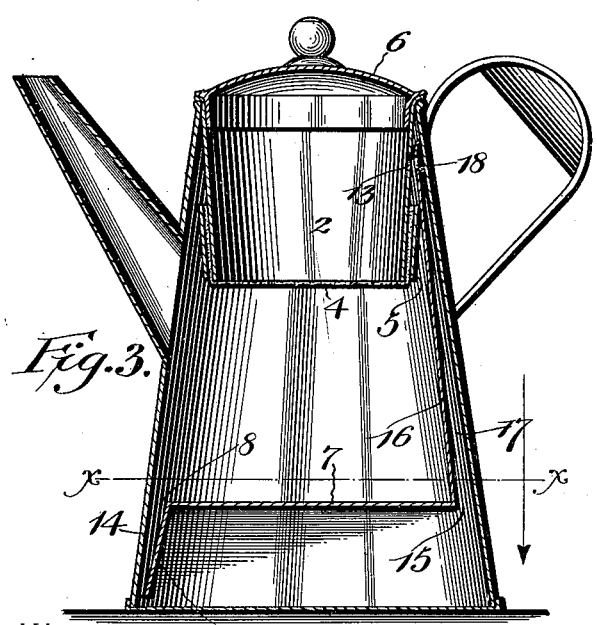
Witnesses
A. Roy Appleman Jr.
T. S. Sheperd.
James A. Wilmot, Inventor.
By his Attorneys,
C. A. Snow & Co.
THE NORRIS PETERS CO., PHOTO-LITHO., WASHINGTON, D. C.

United States Patent Office.

JAMES ALLEN WILMOT, OF OLD ORCHARD, MAINE, ASSIGNOR OF ONE-HALF TO OLIVER W. ALWARD, OF SAME PLACE.

COFFEE-POT.

SPECIFICATION forming part of Letters Patent No. 630,761, dated August 8, 1899.

Application filed October 29, 1898. Serial No. 694,968. (No model.)

*To all whom it may concern:*

Be it known that I, JAMES ALLEN WILMOT, a citizen of the United States, residing at Old Orchard, in the county of York and State of Maine, have invented a new and useful Coffee-Pot, of which the following is a specification.

This invention relates to coffee-pots of that class embodying a percolator or strainer containing the coffee-grounds and means for circulating the water and steam through the coffee-grounds; and the object thereof is to provide certain improvements whereby the circulation of the water and steam is rendered more efficient, all of which will be hereinafter more fully described, and particularly pointed out in the claim.

In the drawings, Figure 1 is a vertical sectional view of a coffee-pot having the improvements applied thereto. Fig. 2 is a vertical sectional view taken at right angles to Fig. 1. Fig. 3 is a view similar to Fig. 1, showing a modified arrangement of the water and steam circulating pipe or passage. Fig. 4 is a horizontal sectional view taken on the line $x\ x$ of Fig. 3.

Like numerals of reference denote like and corresponding parts in each of the several figures of the drawings.

Referring to the accompanying drawings, 1 designates the body of the pot, of any common or preferred form, having the usual spout and handle.

Suspended within the top of the pot is a percolator of any desired construction, but preferably consisting of a tubular body 2, open at both ends and supported within the pot by means of an upper annular rim or flange 3, which rests upon the top edge of the mouth of the pot. A suitable straining or filtering cloth 4 is secured across the lower end of the tubular body 2 by means of a ring or band 5 clamping the edges of the cloth between itself and the exterior of the body 2. A cover 6 fits the top of the body 2 and forms a cover to the pot.

Situated a suitable distance above the bottom of the pot is a partition or false bottom 7. A portion of the edge of this partition is notched or cut away for a short distance, as shown in Fig. 4, forming a slot 8. Extending down from the straight edge of this slot is a strip of tin or other suitable sheet-metal shield 9, reaching nearly to the bottom of the pot and forming with the side of the pot a passage 14 for the circulation of the water from the upper compartment above the partition to the lower compartment below the partition. The passage may be formed in this manner, or a simple tube or pipe may be used.

As shown in Fig. 1, communication is had between the lower compartment and the percolator to convey the boiling water and steam thereto by means of an exterior pipe or passage 10. This passage opens into the lower compartment at or near its top, as at 11, and opens into the upper compartment near its top and above the liquid contents of the pot, as at 12. The tubular body 2 of the percolator is provided with an opening 13 through its side, which is adapted to register with the discharge-opening 12 of the passage 10. By this arrangement the water in the upper compartment passes to the lower compartment through the passage 14, where it is boiled, and as the steam collects it will escape and force the water out through the opening 11, up the pipe or passage 10, and be discharged into the percolator, mixing with the coffee-grounds therein and dropping back into the upper compartment. This circulation of water and steam is continued as long as the water is allowed to boil, and the flavoring properties of the coffee-grounds are extracted and diffused through the water in a complete and effective manner.

As is well understood, boiling water bubbles and gives off steam from its surface, so that the force of the expanding steam will more readily cause the water to escape out through the opening 11 at the surface of the water and then back through the passage 14, which opens into the water near the bottom thereof. Therefore the purpose of the shield 9 is to prevent the water from passing back into the upper compartment, and the opening 11 is arranged near the top of the lower compartment to more readily and effectively convey the boiling water and steam through the passage 10 to the percolator.

A modified arrangement of the water and steam circulating passage is shown in Fig. 3, in which instead of having the same on the outside of the pot it is placed upon the inside thereof. Opposite the slot 8 another slot 15 is formed in the partition, and a shield 16, of sheet metal, extends upward therefrom, forming with the side of the pot a closed passage 17, similar to the passage 14 and provided with an opening 18 at or near its top to discharge into the percolator, as heretofore described.

The arrangement of the passage communicating from the upper compartment to the lower compartment and discharging at or near the bottom of the latter compartment and the passage conveying the water to the percolator having its inlet-opening at or near the top of the lower compartment, for the purposes heretofore described, is the essential feature of the present invention.

Changes in the form, proportion, and minor details may be made without departing from the spirit and scope or sacrificing any of the advantages of the present invention.

Having thus described the invention, what I claim is—

In a coffee-pot, the combination of a false bottom or partition dividing the pot into an upper and a lower compartment, said partition being provided with a pair of notches at its edge, a passage extending downward from one of the notches and discharging at or near the bottom of the lower compartment and formed by a flat sheet of metal and the inclosed side of the pot, and a similarly-formed passage extending upward from the other notch and discharging above the level of the liquid contents of the pot, substantially as shown and described.

In testimony that I claim the foregoing as my own I have hereto affixed my signature in the presence of two witnesses.

JAMES ALLEN WILMOT.

Witnesses:
W. A. WHITTIER,
W. H. PARSONS.